(12) United States Patent
Zwanzger

(10) Patent No.: US 12,489,621 B2
(45) Date of Patent: Dec. 2, 2025

(54) PROVIDING DATA TO BE PROTECTED IN A SECURED EXECUTION ENVIRONMENT OF A DATA PROCESSING SYSTEM

(71) Applicant: Siemens Aktiengesellschaft, Munich (DE)

(72) Inventor: Johannes Zwanzger, Neubiberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 169 days.

(21) Appl. No.: 18/551,462

(22) PCT Filed: Mar. 7, 2022

(86) PCT No.: PCT/EP2022/055737
§ 371 (c)(1),
(2) Date: Sep. 20, 2023

(87) PCT Pub. No.: WO2022/200027
PCT Pub. Date: Sep. 29, 2022

(65) Prior Publication Data
US 2024/0171387 A1    May 23, 2024

(30) Foreign Application Priority Data

Mar. 24, 2021   (EP) .................................. 21164668

(51) Int. Cl.
*H04L 9/40* (2022.01)
*H04L 9/08* (2006.01)
*H04L 9/30* (2006.01)

(52) U.S. Cl.
CPC .......... *H04L 9/0877* (2013.01); *H04L 9/0825* (2013.01); *H04L 9/3073* (2013.01); *H04L 2209/16* (2013.01)

(58) Field of Classification Search
CPC ... H04L 9/0877; H04L 9/0825; H04L 9/0897; H04L 2209/16; H04L 2209/127; G06F 21/606; G06F 21/74; G06F 21/53
See application file for complete search history.

(56) References Cited

U.S. PATENT DOCUMENTS

2020/0014691 A1\* 1/2020 Ortiz .................. H04L 63/0807
2020/0287901 A1\* 9/2020 Avetisov ................ H04L 9/088
(Continued)

OTHER PUBLICATIONS

Search Report for International Application No. PCT/EP2022/055737, 14 pages, Jun. 29, 2022.
(Continued)

*Primary Examiner* — Thaddeus J Plecha
(74) *Attorney, Agent, or Firm* — Slayden Grubert Beard PLLC

(57) ABSTRACT

Various embodiments include methods for providing data to be protected in a secure execution environment. An example includes: executing an enclave code in the environment; generating a key pair using the code with a public key and a private key; sending the public key to an insecure execution environment outside the secure execution environment; sending the public key and sending first encrypted data to an obfuscated program code, wherein the obfuscated program code is part of the insecure execution environment; verifying the public key by means of the obfuscated program code and, depending on results of the verification, converting the first encrypted data into second encrypted data, wherein the second encrypted data are encrypted with the public key; sending the second encrypted data to the enclave in the secure execution environment; and decrypting the second encrypted data into the data to be protected.

14 Claims, 2 Drawing Sheets

(56) References Cited

U.S. PATENT DOCUMENTS

2021/0064765 A1    3/2021  Lapworth ............... G06F 21/60
2021/0328787 A1*  10/2021  Grieder ............... H04W 12/086

OTHER PUBLICATIONS

Search Report for EP Application No. 21164668.2, 9 pages, Sep. 16, 2021.
Götzfried, Johannes: "Trusted Systems in Untrusted Environments: Protecting against Strang Attackers"; Der Technischen Fakultät der Friedrich-Alexander-Universität Erlangen-Nürnberg;, Dec. 7, 2017.

* cited by examiner

PROVIDING DATA TO BE PROTECTED IN A SECURED EXECUTION ENVIRONMENT OF A DATA PROCESSING SYSTEM

CROSS-REFERENCE TO RELATED APPLICATIONS

This application is a U.S. National Stage Application of International Application No. PCT/EP2022/055737 filed Mar. 7, 2022, which designates the United States of America, and claims priority to EP Application No. 21164668.2 filed Mar. 24, 2021, the contents of which are hereby incorporated by reference in their entirety.

TECHNICAL FIELD

The present disclosure relates to data processing. Various embodiments include systems and/or methods for providing data to be protected in a secure execution environment of a data processing system.

BACKGROUND

When delivering code and/or data to "third-party devices", a dilemma often arises for the creator of the code or data: on the one hand, the code or data must be available on said devices and function as intended in order to serve the intended purpose. On the other hand, it may contain sensitive information (for example company know-how) that should be kept secret from the user or a platform operator, especially a cloud provider.

The "third-party device" can in principle be any type of information-processing system that the creator or owner of the code or data does not have complete control over and for which there is the possibility of misuse of the code or data, in particular through analysis/reverse engineering, modification, cloning, etc. In particular, therefore, it can be a server in the cloud, but also the private PC of a user.

In this case, it is not enough to simply encrypt the code or data used and then decrypt it again as required using software created according to common programming standards, since all the information, in particular the keys required to decrypt the code or data, must then obviously be available in this software and thus on the third-party device. In this case, the software and possibly also the decrypted form of the code or data that is output by it would become the target of an attack.

One of the main approaches to protecting software or the data it handles is obfuscation, which is the transformation of code and data into an equivalent but more difficult-to-understand form. Some automatic tools available on the market allow this transformation step to be performed with comparatively little effort. However, obfuscation is of course only performed at a very general level—in particular by 1:1 translation of the machine code instructions into the corresponding instructions for a virtual machine with its own instruction set—which limits the level of protection that can be achieved. More sophisticated obfuscation techniques usually start at the algorithmic level and logically change the program steps there as well. However, this often requires very complex, algorithm-specific work steps. In general, obfuscation at a higher level ("good" obfuscation with a high level of protection) usually leads to significantly increased resource requirements in terms of memory and software runtime.

SUMMARY

The teachings of the present disclosure include a generally applicable solution with a high level of protection and low resource requirements in order to make sensitive code or data executable or analyzable on a third-party device without disclosing the code or data itself. For example, some embodiments include a method for providing data to be protected (D) in a secure execution environment (TEE) of a data processing system (F), comprising: Executing (S1) an enclave code (C) in the secure execution environment (TEE), Generating (S2) a key pair (K_pub/K_priv) by means of the enclave code (C), wherein the key pair (K_pub/K_priv) comprises a public key (K_pub) and a private key (K_priv), Sending (S3) the public key (K_pub) to an insecure execution environment (U) of the data processing system (F), wherein the insecure execution environment (U) is outside the secure execution environment (TEE), Sending (S4) the public key (K_pub) and sending first encrypted data (D") to an obfuscated program code (0), wherein the obfuscated program code (0) is part of the insecure execution environment (U), Verifying (S5) the public key (P_pub) by means of the obfuscated program code (0) and, depending on results of the verification, converting the first encrypted data (D") into second encrypted data (D'), wherein the second encrypted data (D') are encrypted with the public key (K_pub), Sending (S6) the second encrypted data (D') to the enclave (E) in the secure execution environment (TEE), and Decrypting (S7) the second encrypted data (D') into the data to be protected (D).

In some embodiments, the data processing system (F) is configured as a: Server, Cloud server, Third-party system, Computer and/or Mobile information processing device.

In some embodiments, there is restricted access to the secure execution environment (TEE) that denies the insecure execution environment (U) access to the secure execution environment (TEE).

In some embodiments, the enclave code (C) is configured to generate random numbers, wherein at least one of the random numbers is used to generate the key pair (K_pub/K_priv).

In some embodiments, the second encrypted data (D') are encrypted using a purely asymmetric or hybrid encryption method.

In some embodiments, the first encrypted data (D") are stored on the data processing system (F) in the insecure execution environment (U).

In some embodiments, the key pair (K_pub/K_priv) is configured as an asymmetric key pair.

In some embodiments, during the conversion of the first encrypted data (D") to produce second encrypted data (D') obfuscated intermediate results are created.

In some embodiments, when the public key (K_pub) is verified by the obfuscated program code (0), a check is made to determine whether a valid attestation of the public key (K_pub) is present and wherein the conversion of the first encrypted data (D") into the second encrypted data (D') is carried out only if a valid attestation is present.

In some embodiments, the obfuscated code (0) is stored on the data processing system (F) in the insecure execution environment.

In some embodiments, the data (D) to be protected are configured as: Program code, Interpretable code, Parameterizations for algorithms, Numerical data and/or Weights of a neural network.

In some embodiments, the execution of the enclave code (C) is performed in an enclave (E), wherein the enclave (E) is part of the secure execution environment (TEE).

As another example, some embodiments include a data processing system (F) for carrying out one or more of the methods as described herein, the data processing system (F)

comprising: a secure execution environment (TEE), wherein the secure execution environment (TEE) is configured to: execute an enclave code (C), thereby generating a key pair (K_pub/K_priv), wherein the key pair (K_pub/K_priv) comprises a public key (K_pub) and a private key (K_priv), send the public key (K_pub), an insecure execution environment (U), wherein the insecure execution environment (U) is outside the secure execution environment (TEE), wherein the insecure execution environment (U) is configured to receive the public key (K_pub), an obfuscated program code (0), wherein the obfuscated program code (0) is within the insecure execution environment (U), wherein the insecure execution environment (U) is configured to send the public key (K_pub) and first encrypted data (D") to the obfuscated program code (0), wherein the obfuscated program code (0) is configured to perform a verification of the public key (K_pub) and, depending on results of the verification, to perform a conversion of the first encrypted data (D") into second encrypted data (D'), wherein the second encrypted data (D') are encrypted with the public key (K_pub), wherein the obfuscated program code (0) is further configured to send the second encrypted data (D'), and wherein the secure execution environment (TEE) is configured to receive the second encrypted data (D') and to decrypt the second encrypted data (D').

As another example, some embodiments include a computer program product comprising a computer program, wherein the computer program can be loaded into a storage device of a computing unit, wherein the computer program is used to perform one or more of the methods described herein when the computer program is executed on the computing unit.

As another example, some embodiments include a computer-readable medium on which a computer program is stored, wherein the computer program can be loaded into a storage device of a computing unit, wherein the computer program is used to perform one or more of the methods as described herein when the computer program is executed on the computing unit.

BRIEF DESCRIPTION OF THE DRAWINGS

The special features and advantages of the teachings herein will become apparent from the explanations that follow for several embodiments based on the schematic drawings. In the drawings.

DETAILED DESCRIPTION

Figure 1:
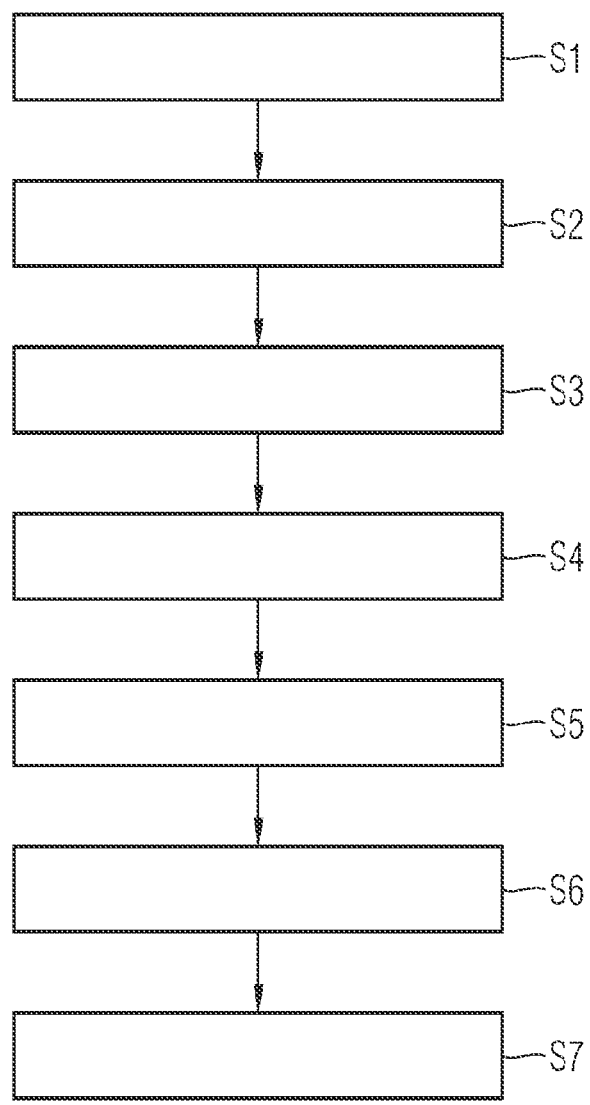
FIG. 1 shows a flow chart of a method incorporating teachings of the present disclosure.

The present disclosure describes systems and/or methods for providing data to be protected in a secure execution environment of a data processing system. An example method comprises:

Executing an enclave code in the secure execution environment,
Generating a key pair by means of the enclave code, wherein the key pair comprises a public key and a private key,
Sending the public key to an insecure execution environment of the data processing system, wherein the insecure execution environment is outside the secure execution environment,
Sending the public key and sending first encrypted data to an obfuscated program code, wherein the obfuscated program code is part of the insecure execution environment,
Verifying the public key by means of the obfuscated program code and, depending on results of the verification, converting the first encrypted data into second encrypted data, wherein the second encrypted data are encrypted with the public key,
Sending the second encrypted data to the enclave code in the secure execution environment; and
Decrypting the second encrypted data, using the private key, into the data to be protected, by means of the enclave code in the secure execution environment.

Subsequently, the processing of the data to be protected can be performed in the secure execution environment by means of the enclave code.

One aspect of the methods comprises decrypting data to be protected directly on a third-party device, but making them available there only to enclave code in a secure execution environment, while the data to be protected are converted in an insecure execution environment.

In some embodiments, there is restricted access to the secure execution environment that denies the insecure execution environment access to the secure execution environment. This has the advantage that an attacker does not have access to the secure execution environment and the data there.

Thus, for the protection of the data to be protected, in particular of a code to be protected, it is assumed that there is a secure execution environment, a so-called trusted execution environment (TEE), on the data processing system, in particular on a third-party device, which is distinguished from an insecure execution environment (one controlled by the user/platform operator) on the data processing system by the following properties.

The secure execution environment can execute enclave code, especially in an enclave, whose memory content is not accessible from another enclave or the insecure execution environment (either to other running applications or to the operating system of the data processing system).

In addition, the secure execution environment provides the enclave code running within the enclave with the ability to attest to the outside, i.e. to the insecure execution environment or outside the data processing system, for specific data, particularly cryptographic keys, that said data have been generated by the unmodified enclave code within the enclave in the secure execution environment. The attestation can be verified outside by code, especially the obfuscated program code, which can be developed without concrete knowledge of the data processing system. However, the obfuscated program code may receive information about the data processing system as input at runtime, if necessary.

Thus, the obfuscated program code is implemented for execution in the insecure execution environment of a data processing system, in particular a third-party device, with the following properties.

The obfuscated program code can verify the attestation of a public key generated by the enclave code, by means of the properties mentioned in the previous paragraph. Thus, the public key is verified by the obfuscated program code as to whether the attestation was created in a secure execution environment (by a trusted enclave).

If the attestation was successful, the obfuscated program code converts first encrypted data, especially pre-encrypted data, into second encrypted data.

In some embodiments, this is done with a symmetric decryption function Dec_sym under a symmetric key K_sym together with an asymmetric encryption Enc_asym by means of D'=Enc_asym (Dec_sym (D", K_sym), K_pub), with D'=second encrypted data, and D"=first encrypted data. Note: Dec_sym (D", K_sym)=D.

In this context, Enc_asym is a hybrid encryption method in which a symmetric key randomly generated at the time of encryption is encrypted with K_pub, which in turn is used to encrypt the payload of the data to be protected, in particular for performance and resource reasons.

Due to the obfuscation applied by the obfuscated program code, the above partial functions, in particular the attestation verification, the symmetric decryption from the first encrypted data into the data to be protected and the hybrid encryption from the data to be protected into the second encrypted data in the obfuscated program code, are neither analyzable nor separable from each other by an attacker. In particular, it is not possible for an attacker to infer from obfuscated intermediate results of the partial functions their logical counterpart, especially decrypted portions of the data to be protected.

Nor can the attacker manipulate the verification of the attestation of the public key in the obfuscated program code in such a way that an unattested or incorrectly attested public key can be used to generate the output of the second encrypted data. This must be prevented, because otherwise an attacker could use the private counterpart of the unattested public key to decrypt the second encrypted data.

The steps mentioned for the creation of the obfuscated program code have to be carried out only once per key K_sym and can be performed without knowledge of the data processing system, in particular of the third-party devices on which the obfuscated program code will later be used.

In particular, the same obfuscated program code can be used on different third-party devices. For attestation, only a small part of the obfuscated program code has to be matched to the enclave code, in particular in the form of a constant that corresponds to a hash of the enclave code and can be used in the attestation verification to determine the integrity (i.e. "non-alteration") of the enclave code.

The data to be protected, before being taken to the data processing system, are pre-encrypted into the first encrypted data. In some embodiments, this is done with the symmetric encryption function. If the symmetric key K_sym remains the same, this step only has to be performed once for each data set of the data to be protected. This step can also be performed without knowledge of the third-party devices on which the obfuscated program code will later be used. In particular, the same obfuscated program code can be used on different third-party devices.

For each third-party device, the obfuscated program code and the first encrypted data are transferred to the insecure execution environment, either online or "offline," e.g. by installation disk, which may also contain the additional software intended to use the results computed by the enclave code based on the data to be protected.

In some embodiments, the second encrypted data may be sent from the obfuscated program code to the insecure execution environment prior to the second encrypted data being sent to the enclave in the secure execution environment.

In some embodiments, the data processing system is configured as a:
Server,
Cloud server,
Third-party system,
Computer and/or
Mobile information processing device.

In some embodiments, the secure execution environment is configured as a trusted execution environment (TEE).

In some embodiments, the enclave code is configured to generate random numbers, wherein at least one of the random numbers is used to generate the asymmetric key pair. The random numbers can be configured as true random numbers or as pseudo-random numbers, wherein the pseudo-random number generation must be based on a secret (seed) known only within the enclave. The random numbers cannot be predicted even with knowledge of the enclave code.

In some embodiments, the second encrypted data are encrypted using a hybrid encryption method. If the attestation was successful, the obfuscated program code converts first encrypted data, especially pre-encrypted data, into second encrypted data.

In some embodiments, this is done with a symmetric decryption function Dec_sym under a symmetric key K_sym together with an asymmetric encryption Enc_asym by means of D'=Enc_asym (Dec_sym (D", K_sym), K_pub), with D'=second encrypted data, and D"=first encrypted data. Note: Dec_sym (D", K_sym)=D and D"=Enc_sym (D, K_sym) with the encryption function Enc_sym inversely symmetric to Dec_sym.

In this context, Enc_asym is a hybrid encryption method in which a symmetric key randomly generated at the time of encryption is encrypted with K_pub, which in turn is used to encrypt the payload of the data to be protected, in particular for performance and resource reasons. In some embodiments, the symmetric key for the hybrid encryption method is not randomly generated, but is deterministically derived using a method that is kept secret by the obfuscated code. This allows the methods to be used even when truly random (non-deterministic) generation of a key is not possible in the insecure execution environment. The first encrypted data D" or the decrypted data D can be used in the derivation method. This guarantees that a different symmetric key is used for the hybrid encryption method for different data D" and D, respectively.

In some embodiments, the first encrypted data are stored on the data processing system in the insecure execution environment. The first encrypted data can thus be stored once and in advance on the data processing system.

In some embodiments, asymmetric encryption and decryption functions (possibly different from enc_asym and dec_asym) are used instead of the symmetric encryption and decryption functions enc_sym and dec_sym. However, the complexity of asymmetric methods in the obfuscated program code is likely to lead to increased resource requirements in terms of memory and runtime.

In some embodiments, during the conversion of the first encrypted data to produce second encrypted data obfuscated intermediate results are created. Due to the obfuscation applied by the obfuscated program code, the above partial functions, in particular the attestation verification, the symmetric decryption from the first encrypted data into the data to be protected and the hybrid encryption from the data to be protected into the second encrypted data, in the obfuscated program code are neither analyzable nor separable from each other by an attacker. In particular, it is not possible for an attacker to infer from obfuscated intermediate results of the partial functions their logical counterpart, especially decrypted portions of the data to be protected.

In some embodiments, when the public key is verified by the obfuscated program code, a check is made to determine whether a valid attestation of the public key is present, wherein the conversion of the first encrypted data into the second encrypted data is carried out only if a valid attestation is present. The obfuscated program code can verify the attestation of a public key generated by the enclave code, by means of the properties mentioned in the previous paragraph. Thus, the public key is verified by the obfuscated program code as to whether the attestation was created in a secure execution environment (by a trusted enclave).

If the attestation was successful, the obfuscated program code converts first encrypted data, especially pre-encrypted data, into second encrypted data.

In some embodiments, the obfuscated code is stored on the data processing system in the insecure execution environment. The obfuscated code is thus stored once and in advance on the data processing system just like the first encrypted data.

In some embodiments, the data to be protected are configured as:
  Program code,
  Interpretable code,
  Parameterizations for algorithms,
  Numerical data and/or
  Weights of a neural network.

The distinction between whether the data to be protected are code or data can be considered fluid. The teachings are also applicable, for example, if the secure execution environment, in particular TEE, does not support the execution of externally introduced native code, i.e. code that is not part of the fixed enclave code. In this case, the data to be protected may be interpretable code, also referred to as data, which is implemented within the enclave by an interpreter contained in the enclave code. Furthermore, several different data sets D1, D2, etc. to be protected can be used simultaneously with the same obfuscated program code.

In some embodiments, the data to be protected may be parameterizations of algorithms that are necessary for their efficient execution, especially in condition monitoring systems and for predictive maintenance.

In some embodiments, the data to be protected may comprise executable or interpretable code comprising in-house know-how, in particular trade secrets, which is protected by execution or interpretation in the secure execution environment, in particular a trusted execution environment.

In some embodiments, the execution of the enclave code is performed in an enclave, as previously mentioned, wherein the enclave is part of the secure execution environment.

Some embodiments include a data processing system for carrying out one or more of the methods described herein. The data processing system may comprise:
  a secure execution environment, wherein the secure execution environment is configured to:
  execute an enclave code, thereby generating a key pair, wherein the key pair comprises a public key and a private key,
  send the public key,
  an insecure execution environment, wherein the insecure execution environment is outside the secure execution environment, wherein the insecure execution environment is configured to receive the public key,
  an obfuscated program code, wherein the obfuscated program code is within the insecure execution environment,
wherein the insecure execution environment is configured to send the public key and first encrypted data to the obfuscated program code,
wherein the obfuscated program code is configured to perform a verification of the public key and, depending on results of the verification, to perform a conversion of the first encrypted data into second encrypted data, wherein the second encrypted data are encrypted with the public key, wherein the obfuscated program code is further configured to send the second encrypted data, and wherein the secure execution environment is configured to receive the second encrypted data and to decrypt the second encrypted data by means of the enclave code.

Some embodiments include a computer program product comprising a computer program, wherein the computer program can be loaded into a storage device of a computing unit, wherein the computer program is used to perform one or more of the methods described herein when the computer program is executed on the computing unit or a computer-readable medium storing such a computer program.

It should be noted that at first glance it might seem possible that the obfuscated program code could also run directly as part of the enclave code in the secure execution environment, in particular in an enclave, instead of in the insecure execution environment, and, after successful verification that the enclave code, which in this case would then contain the obfuscated program code, is running unchanged in the enclave, the first encrypted data could be decrypted into the data to be protected (the need for conversion into the second encrypted data would be eliminated). The problem is that with the obfuscated program code as part of the enclave code, a reflexivity problem arises: as soon as the obfuscated program code is encoded with what the unmodified enclave code must look like, especially based on a hash over the enclave code that is confirmed as part of the attestation, the enclave code also changes as well. Irrespective of this fundamental problem, it may also make sense in principle—depending on the circumstances of the secure execution environment—to run the obfuscated program code outside the secure execution environment, in particular due to resource bottlenecks there or restrictions on the form of the obfuscated program code.

Any content, in particular data to be protected, which can also be configured in the form of code, can be distributed to third-party devices in pre-encrypted form and securely converted there by means of obfuscated code for use within a secure execution environment, in particular a TEE. The data processing system, in particular the third-party devices, need not be known in advance.

Both the conversion and the decision as to whether such a conversion may take place at all occur in obfuscated code locally on the data processing system, in particular the third-party device. Consequently, it is not necessary to have a connection to a trusted remote site, which affords advantages in terms of availability for the user and advantages in terms of handling for the distributor/creator of the content.

The obfuscated conversion can be designed in such a way that it converts for any enclaves that can present a suitable certificate, the obfuscation then only has to be performed once, even for different third-party devices.

The obfuscated code can be applied to any encrypted data, i.e. even in the case of multiple distributed (e.g. at staggered times) contents the obfuscation need only be performed once.

Compared to obfuscation of the application-specific code running in the enclave or of the data processed there, much specific effort is eliminated, since the methods described herein can be applied generically.

The aforementioned advantages may be achieved by the fact that the joint obfuscation of the verification of the attestation of the public key and conversion of the first encrypted data into the second encrypted data in an inseparable block, the obfuscated program code, allows this block to be executed even in untrusted insecure environments. Assuming good obfuscation technique, an attacker cannot separate the two individual operations and also cannot manipulate the obfuscated program code in such a way that it would accept forged, or incorrectly attested, asymmetric public keys. Thus, it can be ensured that the security-critical conversion of the first encrypted data into the second encrypted data is performed only for public keys that are known exclusively in the enclave of the secure execution environment.

The fact that the public key was generated within the secure execution environment of a data processing system, in particular an individual third-party device, but the attestation can be verified with obfuscated program code independent of the specific data processing system, means that the same obfuscated program code can be used for different third-party devices. The conversion of the first encrypted data into the second encrypted data by the obfuscated program code does not depend on the specific data to be protected or the first encrypted data, and so the obfuscated program code can also be reused for different data to be protected.

Furthermore, the obfuscated program code does not depend on the application-specific part of the enclave code running in the enclave and can therefore be used generically across many applications.

In addition, the methods described herein enables a comparatively low-cost approach to protecting company know-how in data to be protected, in particular code that is present or has to be executed on previously unknown third-party devices, compared to individual obfuscation.

Figure 2:
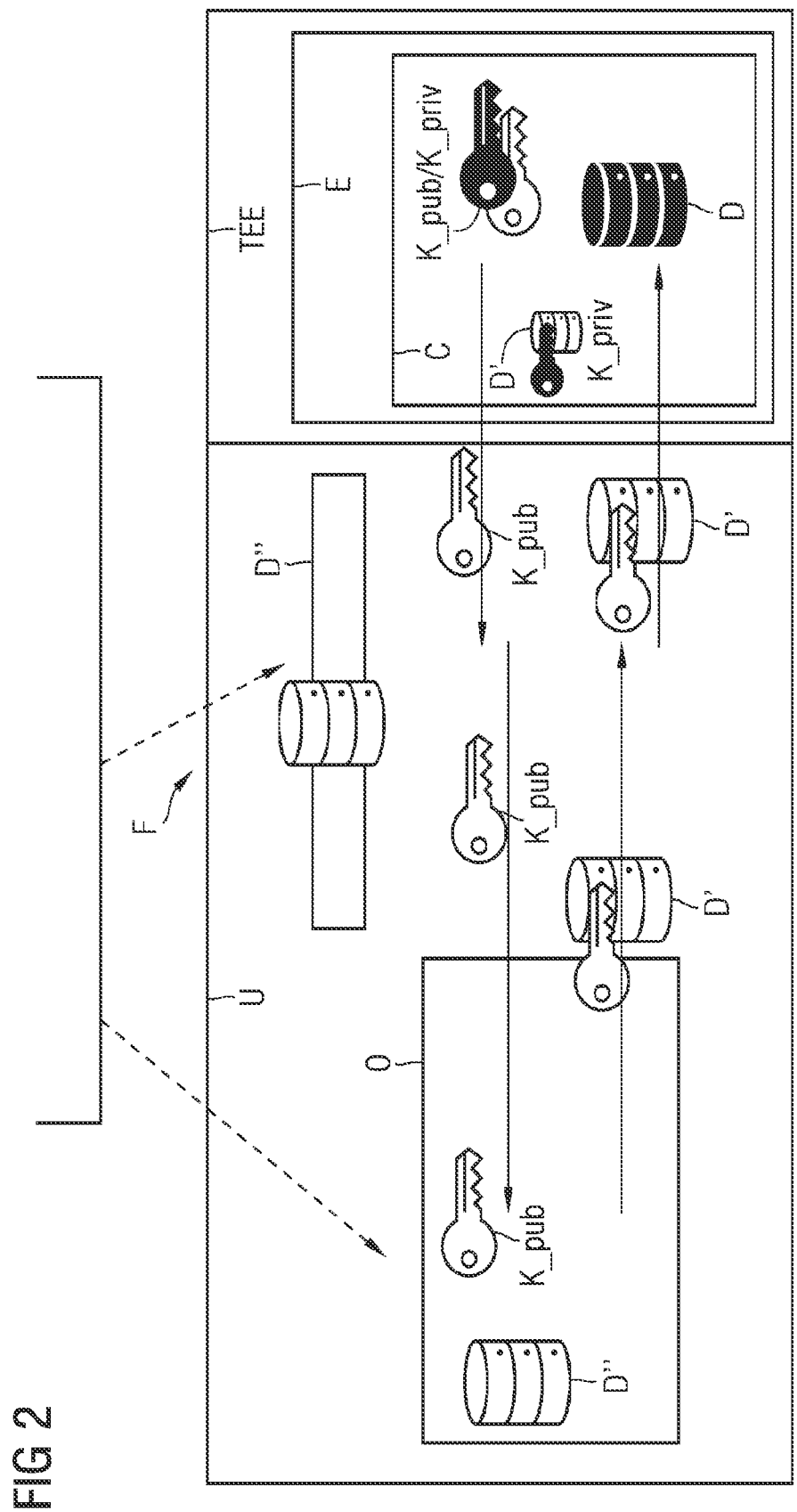
FIG. 2 shows the execution of a method incorporating teachings of the present disclosure in a data processing system incorporating teachings of the present disclosure.

FIG. 1 shows a flowchart of an example method incorporating teachings of the present disclosure for providing data D to be protected in a secure execution environment TEE of a data processing system F and FIG. 2 shows the execution of a method according to the invention using a data processing system incorporating teachings of the present disclosure.

According to FIG. 1, the method comprises the following steps. The components are respectively shown in FIG. 2.

Step S1: Executing an enclave code C in the secure execution environment TEE,

Step S2: Generating S2 a key pair K_pub/K_priv by means of the enclave code C, wherein the key pair K_sub/K_priv comprises a public key K_pub and a private key K_priv, Step S3: Sending the public key K_pub to an insecure execution environment U of the data processing system F, wherein the insecure execution environment U is outside the secure execution environment TEE, Step S4: Sending the public key K_pub and sending first encrypted data D" to an obfuscated program code 0, wherein the obfuscated program code 0 is part of the insecure execution environment U, Step S5: Verifying the public key P_pub by means of the obfuscated program code 0 and, depending on results of the verification, converting the first encrypted data D" into second encrypted data D', wherein the second encrypted data D' are encrypted with the public key K_pub, Step S6: Sending the second encrypted data D' to the enclave E in the secure execution environment TEE, and Step S7: Decrypting the second encrypted data D' into the data to be protected D.

The data processing system F for carrying out a method according to FIG. 1 comprises the following components:
a secure execution environment TEE, wherein the secure execution environment TEE is configured to:
execute an enclave code C, thereby generating a key pair K_pub/K_priv, wherein the key pair K_pub/K_priv comprises a public key K_pub and a private key K_priv,
send the public key K_pub,
an insecure execution environment U, wherein the insecure execution environment U is outside the secure execution environment TEE, wherein the insecure execution environment U is configured to receive the public key K_pub,
an obfuscated program code 0, wherein the obfuscated program code 0 is within the insecure execution environment U,
wherein the insecure execution environment U is configured to send the public key K_pub and first encrypted data D" to the obfuscated program code 0, wherein the obfuscated program code 0 is configured to perform a verification of the public key K_pub and, depending on results of the verification, to perform a conversion of the first encrypted data D" into second encrypted data D', wherein the second encrypted data D' are encrypted with the public key K_pub, wherein the obfuscated program code 0 is further configured to send the second encrypted data D', and
wherein the secure execution environment TEE is configured to receive the second encrypted data D' by means of the enclave E and to decrypt the second encrypted data D'.

The execution of the enclave code C is performed in an enclave E, wherein the enclave E is part of the secure execution environment TEE.

A specific embodiment of the teachings herein is described below. An important partial function in a software, which is publicly offered for sale by the manufacturer, is calculated by a neural network. The weights learned by the network contain know-how of the manufacturer that needs to be protected, and therefore they should not be disclosed. However, the software is supposed to run correctly on the purchasers' devices, of course, so it must be possible to evaluate the neural network there along with the input for the function in some form.

Up to now, software has not made any use of a trusted execution environment (TEE), all code runs in an insecure execution environment U. Thus, it is no problem for an attacker or potential competitor to acquire the software for execution on their own device and analyze its execution there, including the evaluation of the neural network. This problem can be solved with the method of the invention, provided that a TEE as per the requirements described with the invention is present on the purchasers' devices.

The weights of the neural network correspond to the data D to be protected. They are pre-encrypted into the first encrypted data D" with a symmetric key during the software development process and obfuscated program code 0 is created. Both the first encrypted data D" and the obfuscated program code 0 are stored on the data processing system F.

The enclave code C is implemented so that, after the second encrypted data D' have been decrypted into the data D to be protected (i.e. the neural network weights), it can perform the neural network evaluation for any inputs received from the insecure execution environment U and return the result back to the insecure execution environment U into the secure execution environment TEE.

The part of the software that previously performed the neural network evaluation for a specific input is replaced by one that passes the input to the enclave code C and receives the result back from there.

The entirety of the software, including the obfuscated program code 0, the enclave code C and the first encrypted data D", can be delivered to customers in one go as before, e.g. by installation disk or download.

The weights D of the neural network are available in the insecure execution environment U in the encrypted form D", while the decrypted weights are only available within the enclave code C, where they are not accessible to anyone, however—not even the user.

Although the teachings herein have been illustrated and described more thoroughly in detail by the embodiments, the disclosure is not limited by the disclosed examples and other variations may be derived therefrom by those skilled in the art without departing from the scope of protection thereof.

What is claimed is:

1. A method for providing data to be protected in a secure execution environment of a data processing system, the method comprising:
   executing an enclave code in the secure execution environment;
   generating a key pair using the enclave code, wherein the key pair comprises a public key and a private key;
   sending the public key to an insecure execution environment of the data processing system, wherein the insecure execution environment is outside the secure execution environment;
   sending the public key and sending first encrypted data to an obfuscated program code, wherein the obfuscated program code is part of the insecure execution environment;
   verifying the public key by means of the obfuscated program code and, depending on results of the verification, converting the first encrypted data into second encrypted data, wherein the second encrypted data are encrypted with the public key;
   sending the second encrypted data to the secure execution environment; and
   decrypting the second encrypted data into the data to be protected using the enclave code.

2. The method as claimed in claim 1, wherein the data processing system comprises:
   a server,
   a cloud server,
   a third-party system,
   a computer, and/or
   a mobile information processing device.

3. The method as claimed in claim 1, wherein there is restricted access to the secure execution environment that denies the insecure execution environment access to the secure execution environment.

4. The method as claimed in claim 1, wherein the enclave code generates random numbers, wherein at least one of the random numbers is used to generate the key pair.

5. The method as claimed in claim 1, wherein the second encrypted data are encrypted using a purely asymmetric or hybrid encryption method.

6. The method as claimed in claim 1, wherein the first encrypted data are stored on the data processing system in the insecure execution environment.

7. The method as claimed in claim 1, wherein the key pair is configured as an asymmetric key pair.

8. The method as claimed in claim 1, wherein during the conversion of the first encrypted data to produce second encrypted data obfuscated intermediate results are created.

9. The method as claimed in claim 1, wherein when the public key is verified by the obfuscated program code, a check is made to determine whether a valid attestation of the public key is present and wherein the conversion of the first encrypted data into the second encrypted data is carried out only if a valid attestation is present.

10. The method as claimed in claim 1, wherein the obfuscated code is stored on the data processing system in the insecure execution environment.

11. The method as claimed in claim 1, wherein the data to be protected are configured as:
    a program code,
    an interpretable code,
    parameterizations for algorithms,
    numerical data, and/or
    weights of a neural network.

12. The method as claimed in claim 1, wherein the execution of the enclave code is performed in an enclave, wherein the enclave is part of the secure execution environment.

13. A data processing system for carrying out a method for providing data to be protected, the data processing system comprising:
    a secure execution environment configured to: execute an enclave code, thereby generating a key pair comprising a public key and a private key; and send the public key to an insecure execution environment outside the secure execution environment;
    the insecure execution environment configured to receive the public key; and
    an obfuscated program code within the insecure execution environment;
    wherein the insecure execution environment is configured to send the public key and first encrypted data to the obfuscated program code, wherein the obfuscated program code is configured to perform a verification of the public key and, depending on results of the verification, to perform a conversion of the first encrypted data into second encrypted data, wherein the second encrypted data are encrypted with the public key, wherein the obfuscated program code is further configured to send the second encrypted data; and
    wherein the secure execution environment is configured to receive the second encrypted data and to decrypt the second encrypted data.

14. A non-transitory computer-readable medium storing a computer program which can be loaded into a storage device of a computing unit, wherein the computer program performs a method when the computer program is executed on the computing unit, the method comprising:
    executing an enclave code in a secure execution environment;
    generating a key pair using the enclave cade, wherein the key pair comprises a public key and a private key;
    sending the public key to an insecure execution environment of a data processing system, wherein the insecure execution environment is outside the secure execution environment;
    sending the public key and sending first encrypted data to an obfuscated program code, wherein the obfuscated program code is part of the insecure execution environment,
    verifying the public key by means of the obfuscated program code and, depending on results of the verification, converting the first encrypted data into second encrypted data, wherein the second encrypted data are encrypted with the public key;

sending the second encrypted data to the secure execution environment: and decrypting the second encrypted data into the data to be protected using the enclave code.

\* \* \* \* \*